United States Patent [19]

Rogers

[11] Patent Number: 5,349,191
[45] Date of Patent: Sep. 20, 1994

[54] GAMMA RAY DETECTOR FOR THREE-DIMENSIONAL POSITION ENCODING

[75] Inventor: Joel G. Rogers, Vancouver, Canada
[73] Assignee: Triumf, Vancouver, Canada
[21] Appl. No.: 145,143
[22] Filed: Nov. 3, 1993
[51] Int. Cl.$^5$ .......................... G01T 1/20; G01T 1/202
[52] U.S. Cl. ................. 250/367; 250/363.02; 250/363.03
[58] Field of Search ........... 250/366, 367, 368, 363.02, 250/363.03, 363.04

[56] References Cited

U.S. PATENT DOCUMENTS

| | | | |
|---|---|---|---|
| 4,743,764 | 5/1988 | Casey et al. | 250/368 |
| 4,749,863 | 6/1988 | Casey et al. | 250/368 |
| 4,750,972 | 6/1988 | Casey et al. | |
| 4,823,016 | 4/1989 | Yamashita et al. | 250/363.03 |
| 5,091,650 | 2/1992 | Uchida et al. | 250/363.03 |
| 5,122,667 | 6/1992 | Thompson | 250/363.03 |
| 5,300,782 | 4/1994 | Johnston et al. | 250/368 |

OTHER PUBLICATIONS

Rogers, et al., "An Improved Multicrystal 2-D BGO Detector for PET", IEEE Trans. Nucl. Sci., NS-39 1063 (1992).
Dahlbom and Hoffman, "An Evaluation of a Two-Dimensional Array Detector for High Resolution PET", IEEE Transaction on Medical Imaging, vol. 7, pp. 264-272 (1988).
Moses, et al., "Performance of a PET Detector Module Utilizing an Array of Silicon Photodiodes to Identify the Crystal of Interaction", IEEE Trans. Nucl. Sci., vol. 40, No. 4 (Aug. 1993).

Primary Examiner—Paul M. Dzierzynski
Assistant Examiner—Drew A. Dunn
Attorney, Agent, or Firm—Griffin Butler Whisenhunt & Kurtossy

[57] ABSTRACT

An apparatus and method are provided for determining the X, Y and Z positions of a point of gamma ray induced light emission in a pattern of a plurality of scintillating light guides. A plurality of spatially separated, scintillating, crystal, light guides are arrayed in a pattern having known X and Y positions with each of the light guides having a gamma ray receiving end, a light transmitting end, and walls therebetween. A light reflective surface is disposed on at least a portion of the walls having light reflectivity such that a total fraction of light passing through a transmitting end is substantially greater for gamma ray induced light emissions closer to the transmitting end and substantially less for emissions closer to the receiving end. One or more photodetectors are disposed in register with ends of the light guides such that light transmitted therethrough is intercepted by the photodetectors and a detector device determines the excited light guide to thereby establish the X and Y positions of the light within the pattern of light guides. A measuring device is responsive to intercepted light for determining the amount of light and from that determined amount of light determining the position from the transmitting end to the point of induced light emission in the excited light guide, to thereby establish the Z position of the gamma ray induced light within the pattern of light guides.

26 Claims, 5 Drawing Sheets

GAMMA RAY DETECTOR FOR THREE-DIMENSIONAL POSITION ENCODING

The present invention relates to an apparatus for detecting gamma ray emissions, and more particularly to such detection in scintillating light guides which induce light emission in response to the gamma rays. Even more particularly, the present apparatus relates to determining the X, Y and Z positions of the point of the gamma ray-induced light emission in a pattern of a plurality of scintillating light guides.

BACKGROUND OF THE INVENTION

A number of apparatus is well known to the art for detecting gamma rays emitted by or transmitted through an object of unknown internal composition. Such emitted or transmitted gamma rays are indicative of information about the unknown composition. For example, gamma ray transmission and detection is used in medical imaging of human organs and the like by the known method of Positron Emission Tomography (PET). As another example, gamma ray transmission and detection may be used in airports and the like for examining luggage and the like, to detect concealed explosives or other nitrogenous contraband, such as drugs. Gamma ray emissions and transmissions are particularly useful in these fields, as well as others, because the higher energies of the gamma rays will more easily penetrate matter than normal light or even X-rays. Thus, such gamma ray emission or transmission can be used to image the interior of objects which are more or less opaque to normal light or to X-rays.

A very critical component of such apparatus is the gamma ray detector. Conventional gamma ray detectors determine the two-dimensional positions of gamma ray-induced light emissions in the detectors, i.e. the X and Y positions. An example thereof is the detector disclosed in U.S. Pat. No. 4,750,972, the disclosure of which is incorporated herein by reference and relied upon. These two-dimensional position detectors are quite adequate for many purposes, but, for other purposes, the lack of the third dimension position, i.e. the Z dimension of the position in the detector light guide of the gamma ray-induced light emission, creates significant problems. As an example thereof, such conventional detectors are in generally block form having perpendicular slots cut in the block so as to form a plurality of individual rectangular, elongated, light guides between those slots. Photodetectors are placed at an end of the block, and by determining, through the photodetectors, which of the light guides has been excited to produce gamma ray-induced light emission, the X and Y positions of that light emission in the plurality of light guides can be determined, as described in the above-noted U.S. Pat. No. 4,750,972. However, since that block having the light guides may be from as little as 2 cm to as much as 8 cm in length or longer, those conventional detectors provide no information as to where, along that 2 to 8 cm length of the excited light guide, the emission took place, i.e. no information of the Z position of the emission.

While the unknown Z position is not a problem in many applications of gamma ray detection, it is a significant problem in other applications of gamma ray detection. For example, the lack of information regarding the Z position of the light emission in the excited light guide is directly responsible for degrading parts of produced images in conventional apparatus, and in particular in PET cameras and some embodiments of luggage scanning devices. For example, the quality of the images made with PET cameras is generally specified by a measured image spatial resolution, which is defined as the apparent size of an image of a small test source of emitted gamma rays. Because of the lack of information regarding the light emission in the excited light guides in the Z position, the spatial resolution of existing PET cameras is much worse at the edges of an extended object, such as a human torso, than it is at the center of the object. This loss of resolution causes blurring of the image of the edges, and such blurring can obscure objects or portions of interest which might lie at those blurred edges.

Accordingly, as can be easily understood, a significant advantage could be achieved if the position of the point of gamma ray-induced light emission in light guides could be determined for all of the possible X, Y and Z positions. Having established the three-dimensional position of the gamma ray-induced light emission in the light guide, the blurring, noted above, can be largely obviated. However, a practical means of determining the Z position of the gamma ray-induced light emission in light guides has eluded the art, and the difficulty in this regard can be easily understood from even a brief consideration of conventional detectors employing those light guides.

Thus, in conventional detectors, a plurality of spatially-separated, closely adjacent, elongated, scintillating, crystal, light guides are arrayed in parallel relationship to each other and in a pattern having known X and Y positions for each of the light guides. Each of the light guides has a gamma ray receiving end, a light transmitting end and walls therebetween. A light reflective surface, usually provided by a light reflective coating, is placed on at least the walls of each of the light guides, and, usually, a plurality of photodetectors are disposed in register with one of the ends of the light guides. The photodetectors are arrayed in a pattern having known X and Y positions.

With this arrangement, when gamma rays enter the gamma ray receiving end of the light guides, under statistical probabilities, a gamma ray will, with a high degree of probability, induce a light emission in one of the light guides. Because of the reflective surface, e.g. coating, on the walls of that light guide (as well as on the walls of all of the other light guides) that light emission travels through the light guide and exits the light guide at one of the ends thereof. Since the photodetectors are in register with one of the ends and have known X and Y positions, the photodetectors, with appropriate counting means, as disclosed in U.S. Pat. No. 4,750,972, can determine, with reasonable certainty, which light guide was excited by reception of a gamma ray and, hence, produced the emitted light. Knowing which guide was so excited, establishes the X and Y positions of that gamma ray, relative to the array of light guides. Conventional detectors of this nature are well known in the art. A concise explanation of their operation is set forth in Rogers, et al, "An Improved Multicrystal 2-D BGO Detector for PET", IEEE Trans. Nucl. Sci., NS-39 1063 (1992), as well as in Dahlbom and Hoffman, "An Evaluation of a Two-dimensional Array Detector for High Resolution PET", IEEE Transaction on Medical Imaging, Volume 7, pages 264–272 (1988).

The photodetectors detect, therefore, essentially the presence of light produced in a particular light guide, upon entry thereof by a gamma ray, but the determination of the presence of light emitted in a light guide cannot provide any information as to whether that emitted light came from a position in the light guide near the light transmitting end or from a position in the light guide nearer the gamma ray receiving end, i.e. the Z position. Since, as noted above, conventional light guides may be anywhere from about 2 cm to 8 cm in length, and since conventional detectors cannot tell where along that 2 to 8 cm length the light emission took place, there is no possibility of establishing the Z position of that light emission. Without that Z position, as noted above, images, for example in a PET camera, are blurred, particularly near edges of an object being imaged.

A recent approach in the art, generally, directed to this problem, i.e. blurred images, is disclosed in U.S. Pat. No. 5,122,667 to Thompson. However, the device described in the Thompson patent applies only to small single crystal detectors, rather than an array of a plurality of crystal detectors, and is, therefore, not useful in common commercial PET cameras, which employ block detectors, as briefly described above, and which block detectors are essential for purposes of economy of manufacture. In addition, the approach of the Thompson patent is that of providing a localized surface treatment of the crystal so as to form a band which absorbs light which would otherwise be reflected, and that surface treatment is located precisely at a point which divides the crystal into two equally possible depths. While this can give some general idea of the Z position of the emitted light in the light guide crystal, this approach produces a very inaccurate Z position result having only two possible values, and the accuracy thereof is not sufficient for avoiding the imaging problem, as discussed above.

As can, therefore, be appreciated from the above, it would be a substantial advantage to the art to provide means and methods for determining the three-dimensional position of the point of gamma ray-induced light emission in a pattern of a plurality of scintillating light guides. With that three-dimensional position determined, the difficulties, noted above, with PET cameras and luggage inspection apparatus, as well as other apparatus, can be largely avoided and improved imaging can thereby be achieved.

BRIEF DESCRIPTION OF THE INVENTION

The present invention is based on several primary discoveries and several subsidiary discoveries. First of all, as a primary discovery, it was found that conventional gamma ray detectors, as briefly described above and as described more fully below, could be modified such that the total fraction of light passing through the transmitting end of a light guide is substantially greater for gamma ray-induced light emissions closer to the transmitting end and substantially less for emission closer to the receiving end. This provides additional data, in terms of the quantity of light actually transmitted through the transmitting end of the light guide to the photodetectors.

As a second primary discovery, it was found that such transmitted fraction of light is proportional to the distance of the point of the gamma ray-induced light emission from the transmitting end of the light guide in the Z direction.

As a third primary discovery, it was found that means may then be provided which are responsive to the light intercepted by photodetectors for determining the amount of emitted light received by the photodetectors from an excited light guide(s), and from that determined amount of emitted light, determining the distance from the transmitting end of the light guide to the point of gamma ray-induced light emission in the excited light guide, to thereby establish the Z position of the gamma ray-induced light within a conventional pattern of light guides.

As a subsidiary discovery in this regard, it was found that the light reflective surface, e.g. light reflectivity of the coating, on the walls of the light guides may be adjusted such that the total fraction of light passing through the transmitting end of the light guide is substantially greater for gamma ray-induced light emissions closer to the transmitting end and substantially less for emissions closer to the receiving end.

As a further subsidiary discovery in this regard, it was found that a combination of the light reflecting surface, e.g. coating, and the cross-sectional area of the light guides could also be arranged such that the total fraction of light passing through the transmitting end is substantially greater for gamma ray-induced light emissions closer to the transmitting end and substantially less for emissions closer to the receiving end.

As a further subsidiary discovery in this regard, it was found that the reflective surface on the walls of the light guides may be substantially uniform in reflectivity along those walls and the cross-sectional area of the light guides may be dimensioned such that the total fraction of light passing through the transmitting end is substantially greater for gamma ray-induced light emissions closer to the transmitting end and substantially less for emissions closer to the receiving end.

As further subsidiary discoveries, it was found that, with these provisions, the fraction of light passing through the transmitting end may be at least 1.3 times greater for gamma ray-induced light emissions adjacent to the transmitting end than light emissions adjacent to the receiving end, and even at least 2 times greater which is preferable. It is the substantially greater value of this fraction, e.g. 1.3 times greater, compared with the gamma ray energy resolving power of the available scintillating material (typically 20% for commonly used bismuth germanate), that enables the invention and clearly delineates the invention from the current state of the art.

Thus, by determining the X and Y positions of the emitted light by use of any of the conventional techniques, such as those referenced above, and by determining the Z position by use of the present technique, all of the X, Y and Z positions of the point of gamma ray-induced light emission in the pattern of a plurality of scintillating light guides may be determined, and with determining all of the X, Y and Z positions, the blurred images, noted above, may be largely avoided.

Thus, briefly stated, in one aspect the present invention provides an apparatus for determining the X, Y and Z positions of the point of gamma ray-induced light emission in a pattern of a plurality of scintillating light guides. In this apparatus there is provided a plurality of spatially separated, closely adjacent, elongated, scintillating, crystal, light guides arrayed in a pattern having known X and Y positions for each light guide. Each of the light guides has a gamma ray receiving end and a light transmitting end and walls therebetween. A light reflective surface, e.g. a light reflective coating, is disposed on at least a portion of the walls of each of the light guides which surface has light reflectivity such that a total fraction of gamma ray induced light passing through a transmitting end is substantially greater for gamma ray-induced light emissions closer to the transmitting end and substantially less for emissions closer to the receiving end.

At least one photodetector is disposed in register with the transmitting ends such that the total fraction of gamma ray-induced light transmitted through the transmitting ends is intercepted by the at least one photodetector.

Detector means responsive to gamma ray induced light emitted in the light guides are provided for determining an excited light guide from which gamma ray-induced light was emitted, to thereby establish the X and Y positions of the gamma ray-induced light within the pattern of light guides.

Measuring means responsive to light intercepted by at least one photodetector are provided for determining the amount of emitted light received by the at least one photodetector from the excited light guide and, from that determined amount of emitted light, determining the distance from the transmitting end to the point of gamma ray-induced light emission in the excited light guide, to thereby establish the Z position of the gamma ray-induced light within the pattern of light guides.

In addition, a method for determining those X, Y and Z positions is provided, which method corresponds to, primarily, the operation of the above-described apparatus.

DETAILED DESCRIPTION OF PREFERRED EMBODIMENTS

Figure 1A:
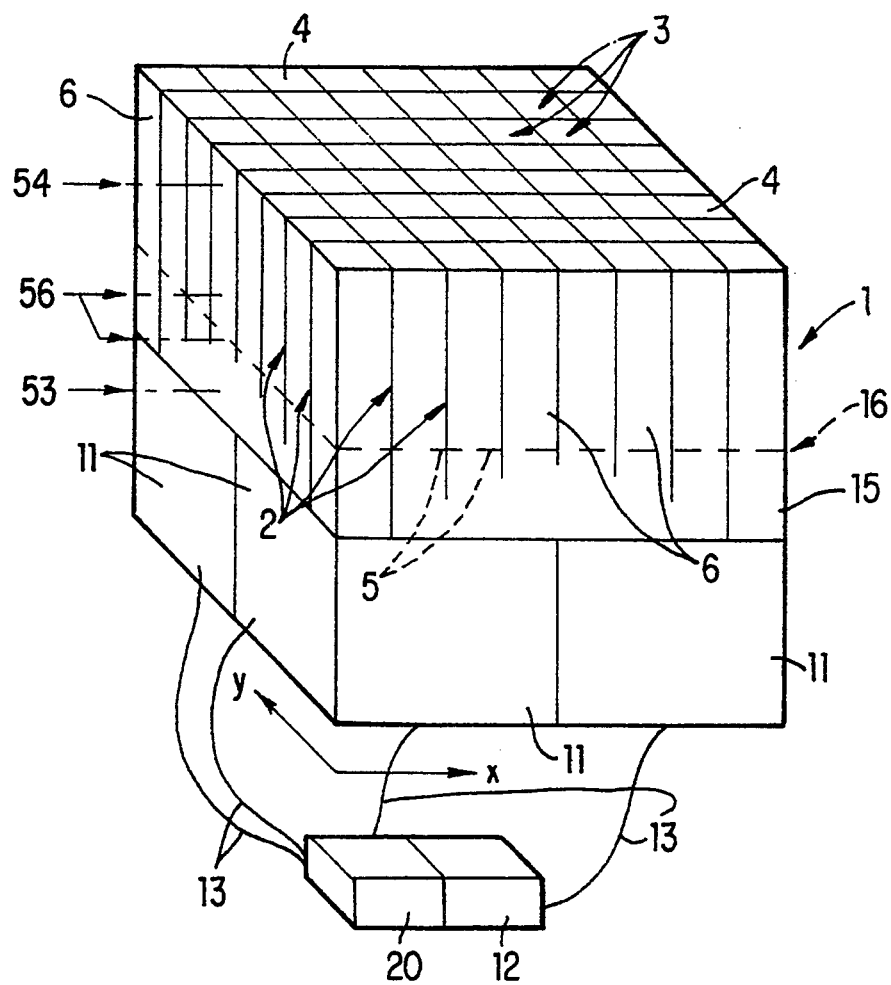
FIG. 1A is an idealized isometric view of a conventional block gamma ray detector, but which has been modified, according to the present invention.

In order to understand, completely, the present invention and the significance thereof, a complete understanding of the conventional two-dimensional detectors must first be provided. In this regard, FIG. 1 shows a typical conventional two-dimensional detectors, but with the present improvement included therein.

As shown in FIG. 1, a conventional detector, such as described in detail in U.S. Pat. No. 4,750,972, has a scintillator block, generally 1, with a plurality of perpendicular slots 2 formed therein, e.g. by sawing, so as to produce a plurality of spatially separated, closely adjacent, elongated, scintillating, crystal light guides 3 which are arrayed in a pattern having known X and Y positions. Each of the light guides has a gamma ray receiving end 4 and a light transmitting end 5 with walls 6 therebetween. A single light guide is shown in FIG. 1B for clarity purposes in this regard.

A light reflective surface 10 (see FIG. 1B) is disposed on at least a portion of the walls of each light guide. The light reflecting surface may be provided by those techniques common in the art, such as a highly polished outside surface, special surface treatments, including ion infusion, and the like, but, more preferably, a light reflecting coating will be applied thereto, and the specification will be hereafter discussed, mainly, in connection with that preferred embodiment for conciseness, but it is to be understood that the invention extends to any of the conventional means of obtaining the light reflecting surface. In this regard, it is preferable that the light reflecting surface, e.g. coating, be entirely over all the walls of the light guide and more preferably that surface, e.g. coating, extends over gamma ray receiving end 4, at least with some conventional embodiments, since this will ensure greater accuracy, but less than all of the walls 6 and the gamma ray receiving end 4 may have such a surface, e.g. light reflective coating.

In this common conventional embodiment, a plurality of photodetectors 11, e.g. 4 or more photodetectors, are disposed in register with the light transmitting ends 5 such that gamma ray-induced light transmitted through transmitting ends 5 is intercepted by the photodetectors 11. While there should be 4 or more photodetectors in this common conventional embodiment, there is really no upper limit on that number. The more photodetectors, the more accurate the determinations, but from a practical point of view, space considerations limit the number of photodetectors of conventional design, e.g. photomultiplier tubes. The photodetectors are arrayed in a pattern having known X and Y positions. The photodetectors are preferably photomultiplier tubes or photodiodes, but any conventional photodetector may be used. Detection means 12 is connected to photodetectors by wires 13 and is for the purpose of determining an excited light guide from which gamma ray-induced light is detected by the photodetectors, in a conventional manner, to thereby establish X and Y positions of the gamma ray-induced light within the pattern of light guides.

In another conventional embodiment, a first array of photodetectors, e.g. photodiodes, are disposed at one of the ends of the light guides and another or a second array of a plurality of photodetectors, e.g. photomultiplier tube(s), are disposed at the other of the ends of the light guides. The first array is used to determine the X-Y position of emitted gamma ray induced light and the another or second array of photodetectors provide a timing pulse and energy discrimination (see, for example, Moses, et al, *Performance of a PET Detector Module Utilizing an Array of Silicon Photodiodes to Identify the Crystal of Interaction,* IEEE Transactions of Nuclear Science, Vol. 40, No. 4, August 1993).

These two different arrangements are possible, since, of course, gamma ray induced light emission will travel toward both ends of the light guides, and in that sense, either end may be the transmitting end. Thus, it really makes no difference, for X-Y position determinations, which of the ends of the light guides the detection of emitted light is made. However, for the Z position determination, the transmitting end is the end having the photodetectors used for determining the Z position, which may or may not be the same photodetectors for determining the X-Y position. In the preferred embodiment, the same photodetectors determine both the X-Y and Z positions, and that embodiment is described in detail below. Thus, while the present invention can use either of these conventional embodiments for determining the X-Y position, as well as other known embodiments therefor, for purposes of conciseness herein, the invention will be explained in reference to the more conventional arrangement where photodetectors are disposed at only one of the ends of the light guides. However, it is to be fully understood that the invention extends to the arrangements where photodetectors are disposed at both of the ends of the light guides, as well as the more conventional arrangement where photodetector(s) are disposed at only one of the ends of the light guides, and the photodetector(s) function for determining both the X-Y position, according to the conventional functions, and the Z position, according to the present invention. Further, in keeping with this conciseness, the conventional terms of "receiving end" and "transmitting end" are used in the specification and claims, but it is to be understood that these terms are intended to embrace either of the ends of the light guides and are used only as convenient and conventional terms to delineate the two different, or opposite, ends.

While not required, as in conventional embodiments, there may be a light transmitting portion 15 interposed between the photodetectors 11 and the light guides 3. That light transmitting portion may be simply a continuation of the scintillator block 1, i.e. a portion of that block below the extension of slots 2 forming light guides 3, i.e. that portion of scintillator block 1 below dashed line 16. Alternatively, the light guides 3 may be mounted on and optically connected to a separate light transmitting portion, such as glass. This is usually done when it is desired to manufacture each light guide separately and attach the separately manufactured light guides to a support, which support may be a block of glass, as would be appropriate for mounting those light guides. This is opposed to the method of manufacture where the light guides are made from a single scintillator block 1 with the slots 2 not traversing entirely through the block, so that a remaining light transmission portion 15 exists.

In addition, there may be a similar light transmitting portion (not shown in the drawings) disposed at the gamma ray receiving end, as is also conventional in some common embodiments, i.e. a light transmitting portion at each of the ends of the light guides or at only the receiving end or transmitting end.

Figure 1B:
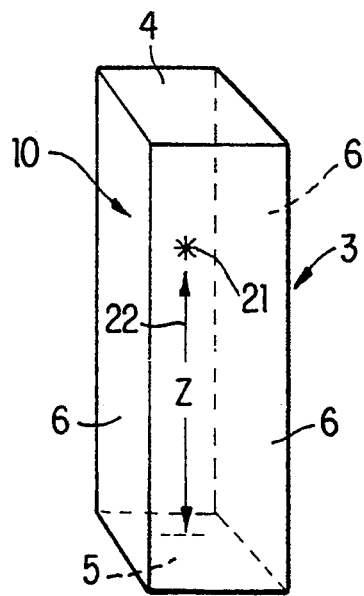
FIG. 1B is an idealized isometric view of one light guide of the detector of FIG. 1A.

According to the present invention, a measuring means 20 is provided which is responsive to light intercepted by the photodetector(s) (which may be the same or different photodetectors used to determine the X-Y position) for determining the amount of emitted light received by the photodetector(s) from the excited light guide and, from that determined amount of emitted light, determining the distance from the transmitting end 5 (or the inverse, i.e. the distance from the gamma ray receiving end 4) to the point 21 (see FIG. 1B) of the gamma ray-induced light emission in the excited light guide, to thereby establish the Z position of the gamma ray-induced light emission point within the pattern of light guides, as shown by line 22 in FIG. 1B.

The crystal of the light guides may be any conventional scintillating crystal, and the particular crystal is not critical to the present invention. However, the choice of crystal material will effect the accuracy of the determination of the Z position. In general, the more accurately the crystal and photodetector combination measures the quantity of light emitted by the scintillator, the more accurately can the Z position be determined. The ability of a crystal/photodetector combination to measure accurately a quantity of light is specified by a property called "gamma ray energy resolving power". Bismuth germanate, for example, when combined with conventional photodetectors, e.g. in the form of photomultiplier tubes, conventionally demonstrates a gamma ray energy resolving power of approximately 20% for the gamma rays used in PET. Other scintillators, generally more expensive or more difficult to manufacture than bismuth germanate, have better, i.e. smaller, gamma ray energy resolving power than bismuth germanate, and, therefore, would give a more accurate measurement of the Z position. However, for ease of manufacture and convenience of use, the crystal of the light guide is, preferably, the conventional bismuth germanate.

As shown in FIG. 1A, the light guides may have a generally rectangular cross-section, as is conventional in the art, but that cross-sectional configuration is not critical to the invention. The cross-sectional configuration may be oval or circular or triangular or any other cross-section, but for ease of manufacture by sawing slots into a block of the scintillator material, as illustrated in FIG. 1A, preferably, the light guides are rectangular in cross-section.

Also, as shown in FIG. 1A, the gamma ray receiving end 4, as well as the transmitting end 5, may be substantially planar, which is conventional in the art, but, here again, that is not critical to the invention. The gamma ray receiving end can be convex or concave, e.g. any surface configuration which is consistent with accurately passing gamma rays therethrough.

However, the preferred form of the invention, especially for ease of manufacture, is where the light guides are formed in a scintillator block 1, with the light guides 3 extending less than a height of the block so as to provide a continuous light transmitting portion 15 of the block (below about approximately dashed line 16) which is adjacent the light transmitting ends 5 of the light guides 3, although, as noted above, there may be a light transmitting portion at receiving end 4 or at both ends. The size and shape of the continuous light transmitting portion are often carefully selected for the purpose of tuning the light distribution among the photodetectors, which in turn improves the X and Y position determination, as described in detail in U.S. Pat. No. 4,750,972. Alternatively, however, as noted above, that continuous light transmitting portion 15 may be separate from the scintillator block 1, e.g. a glass block or the like may form light transmitting portion 15. In any case, the light transmitting portion is usually co-extensive with the X-Y dimensions of the scintillator block 1, or slightly oversized by up to about 20-30% of those dimensions, and the Z-direction dimension of the light transmitting portion 15, when present, is up to about 40% of the Z-direction dimension of the light guides.

In the preferred embodiments, the light guides are generally uniform in cross-section and are rectangular in cross-section and are formed in a generally rectangular scintillator block 1 with slits 2 in the block extending from the receiving ends 4 to the light transmitting ends 5 so as to spatially separate the light guides so formed in the block. With this arrangement, it is very easy to apply a reflective coating on the walls 6 (or otherwise provide the reflective surface as discussed above) and the gamma ray receiving end 4 of the light guides 3 by a simple emersion process, as explained more fully below. The conventional emersion process will provide a substantially uniform reflectivity of the coating along the walls of each light guides and, at least in some embodiments, on the receiving ends of the light guides, but, for present purposes, that reflectivity may not be uniform, as explained more fully below.

Most preferably, according to the present invention, the cross-sections of the light guides are dimensioned such that the total fraction of light passing through the transmitting end 5 is substantially greater for gamma ray-induced light emissions closer to the transmitting end 5 and substantially less for emissions closer to the receiving end 4. To better understand this concept, and the significance thereof, reference is made to FIGS. 1C–1F.

Figure 1C:
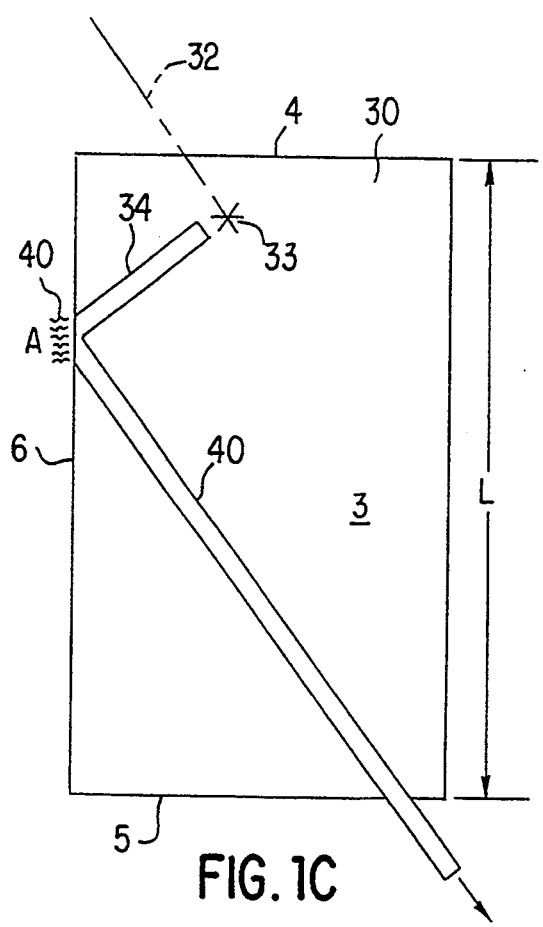
FIGS. 1C, 1D, 1E and 1F are highly idealized representations of emitted light paths through conventional light guides (FIGS. 1C and 1E) as compared with the light guides of the present invention (FIGS. 1D and 1F)
Figure 1D:
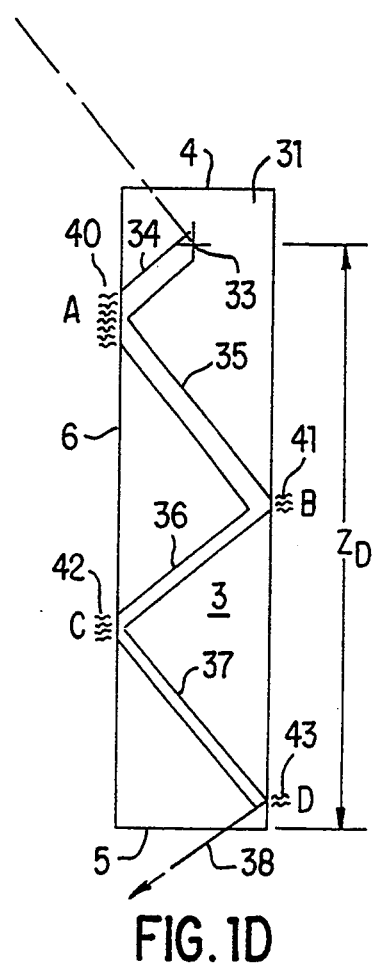

FIGS. 1C and 1D are highly diagrammatic illustrations where 30 diagrammatically illustrates a conventional light guide with conventional dimensions and cross-section and 31 highly diagrammatically illustrates a light guide used in the present invention with different dimensions and cross-section. In FIG. 1C, representing a conventional light guide, a gamma ray 32 passes into light guide 30 from receiving end 4 and, by statistical occurrence, causes an emission at 33 of photons 34. The same is true for the highly diagrammatic illustration of the present light guide, as shown in FIG. 1D. However, for one path of photons 34, those photons will, eventually, strike a wall 6 having the reflective coating thereon and reflect from that wall. For a right-angle reflection, FIG. 1C shows that a single reflection at A is all that is required for those photons to exit the transmitting end 5 of light guide 3. Since the reflective coatings normally used in the art are quite efficient, and while there is some loss of light at reflective point A through the coating, that loss of light is very small. Thus, for a relatively low number of reflections from the walls while a path of photons is being reflected through the light guide, the loss of light in conventional light guides is insignificant (compared to the gamma ray energy resolving power of the selected scintillator material), and the decrease in the quantity of photons, as shown by the thickness of the paths of photons 34 and 40, is quite small and insignificant.

However, in a light guide with a much smaller cross-section, as shown in FIG. 1D, that very much smaller cross-section will cause reflections at all of points A, B, C and D. Again, while the amount of light lost through the reflective coating at any one reflection point is small, when the total number of reflections is substantially increased over that which would be experienced in a conventional light guide, the total loss of light becomes quite significant, i.e. much larger than the gamma ray energy resolving power of the scintillator material which is typically 20% for commonly used bismuth germanate, as shown by the decreased line thicknesses of the paths of photons 34, 35, 36, 37 and 38. This is due to cumulative losses of light 40, 41, 42 and 43 through walls 6 of light guides 3.

Figure 1E:
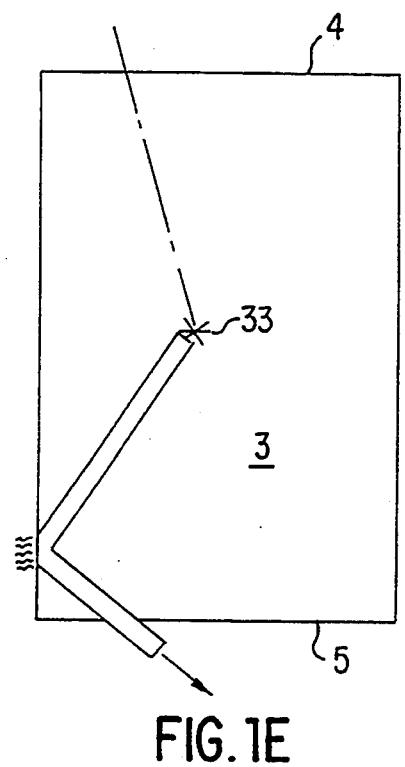
Figure 1F:
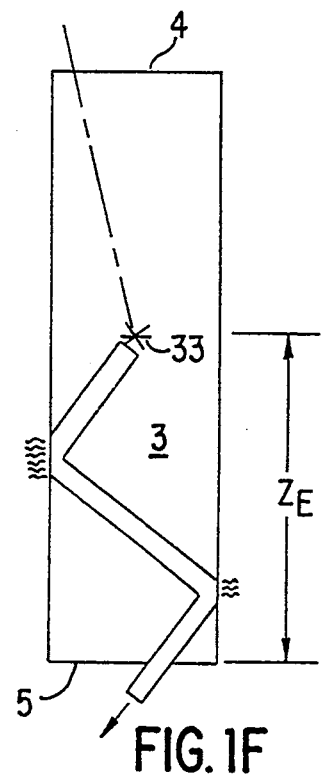

FIGS. 1E and 1F show the same situation as FIGS. 1C and 1D, but where the light emission 33 takes place further along the length of the light guides 3 than that which took place in connection with FIGS. 1C and 1D. Here again, the loss of light through the conventional light guides, as highly diagrammatically illustrated in FIG. 1E, is insignificant. On the other hand, there is a significant loss of light through the present light guides with the smaller cross-section as shown in the highly diagrammatic illustration of FIG. 1F. However, in comparing FIGS. 1D and 1F, it will be seen that the amount of light lost in FIG. 1D, where the light emission is in an upper portion of the light guide, is much greater than the light lost in FIG. 1F, where the emission is in a lower portion of the light guide. Therefore, the total fraction of light passing through transmitting end 5 is substantially greater for gamma ray-induced light emissions closer to transmitting end 5 and substantially less for emissions closer to receiving end 4. Accordingly, a differentiation is made between the Z positions for light emissions closer to the transmitting end than to the receiving end, as shown by Z positions $Z_D$ and $Z_E$ in FIGS. 1D and 1F, respectively. Thus, by arranging that there is a significant loss of light while the light passes through the light guides such that a differentiation can be made, a relationship is established between the amount of light transmitted through transmitting end 5 and the Z position of the gamma ray-induced light emission.

To achieve this differentiation in the amount of light passing through transmitting end 5, the light reflective coating may be modified to affect the reflectivity thereof or the cross-sectional area of the light guides may be reduced or a combination thereof. In either case, the light reflective surface, e.g. coating, on the walls of the light guides must have such reflectivity that a total fraction of light passing through the transmitting end is substantially greater for gamma ray-induced light emissions closer to the transmitting end and significantly less for emissions closer to the receiving end, in order to effect the above-discussed differentiation and the ability, thereby, to determine the Z position of the light emission.

In most conventional detectors, a reflective coating is prepared by suspending conventional highly reflectivity solids in a suitable organic carrier. The carrier may be any carrier which will hold those reflective solids to the walls of the light guides, but those carriers are, most generally, plastics, e.g. epoxy resins, polyester resins, silicone resins, etc., and especially clear epoxy resins. A number of high reflective solids are known to the art, e.g. magnesium oxide and magnesium carbonate, but, more usually, simply aluminum oxide in finely divided form is used for the reflective solids. Normally, in order to make the coating as reflective as possible, the solids content of the aluminum oxide, or other reflective solid, is made as high as possible, e.g. at least 50%, and more usually at least 60% or 70%, or even greater. Other methods of applying reflecting surfaces on the walls and receiving ends of the light guides may also be used, such as spray painting or vacuum evaporation, as well as special surface treatments, such as sanding or grinding the surface. Any useful means of controlling and modifying the reflectivity of the walls of the light guides may be used to arrange for a significant difference in the loss of light from reflections between the receiving and transmitting ends of the light guides, and the particular means of achieving this modified reflectivity is not critical and may be as desired.

However, in a preferred embodiment, in the arrangement shown in FIG. 1A, after slots 2 are cut in scintillator block 1, the scintillator block may be immersed, for example, in a mixture of epoxy resin and aluminum oxide, so that the reflective coating covers all walls and the receiving end 4 of the block (the more common process). After hardening of the resin, excess coating is then simply removed from the receiving end, as require, and the slots 2 are, essentially, filled with the epoxy resin/aluminum oxide reflective coating. This provides a uniform reflective coating along the walls of the light guide, and if this common approach is used, then, in order to achieve the differentiation in the amount of the light passing through the transmitting ends, the present light guides are dimensioned, as explained above, such that the total fraction of light passing through the transmitting end is substantially greater for gamma ray-induced light emissions closer to the transmitting end and substantially less for emissions closer to the receiving end, i.e. by virtue of the reduced cross-sectional area.

On the other hand, the reflective coating may have a graduation of the reflective solids therein, so that the reflectivity of the coating is greater toward the receiving end than the transmitting end, and this will also provide a total fraction of light passing through the transmitting end to be substantially greater for gamma ray-induced light emissions closer to the transmitting end and substantially less for emissions closer to the receiving end. This can be achieved, for example, by producing, e.g. cutting, individual light guides, as opposed to simply forming the light guides in a block, as shown in FIG. 1A, and attaching those individual light guides, for example, to a light transmitting portion 15, such as a block glass, or to two such portions at each of the ends of the light guides, as explained above. With individual light guides being made, the graduation and reflectivity of the coating can easily be achieved by conventional coating or other surface preparation techniques.

It will also be appreciated that the differentiation, explained above, must be a significant differentiation, and by arranging either the coating or, more preferably, the dimensions, and hence cross-sectional area, of the light guides, or both, the fraction of light passing through the transmitting end should be at least 1.3 times greater for gamma ray-induced light emissions adjacent to the transmitting end than light emissions adjacent to the receiving end when using conventional bismuth germanate, more preferably at least 1.5 times greater or more, e.g. at least 2.0 or 2.5 times greater.

Significant differentiation will be obtained with a different amount of fractional light loss when a scintillator material, different than bismuth germanate, is employed, depending on the scintillator material's natural gamma ray energy resolving power. For example, cerium doped lutetium oxyorthosilicate is a well known, but more expensive, scintillator having a much better resolving power that bismuth germanate. Therefore, a much smaller fractional difference in the light transmission would be significant in a block detector incorporating cerium doped lutetium oxyorthosilicate than in the more conventional bismuth germanate. To be deemed significant, irrespective of the particular scintillating material, the fraction of light loss must be arranged by the selection of the cross-sectional area of the light guides and/or the reflectivity of the coating, so that the fraction of light loss is greater than the scintillator material's natural gamma ray resolving power.

Conventional light guides for PET are, for example, 2 cm to 3 cm in length and are cut into scintillator blocks of about 2 cm to 6 cm on each side. A very typical conventional block will have 64 light guides, which means that the wall X-Y dimensions of a typical conventional light guide is about 0.3 cm to 1.2 cm, or a cross-sectional area of about 0.3 up to about 1.4 $cm^2$ (depending, usually, on the length of the light guides and the tuning thereof, as explained above). To achieve the differentiation, described above, with the present light guide, and without any graduation of reflectivity of the coating, the cross-sectional area of the present light guides must be about 16% or less of the corresponding conventional light guides (depending on the length of the corresponding conventional light guides). More preferably, the present cross-sectional area is less than 16%, e.g. 14% or 12% or 10% or even 5%, of the conventional value. This means, of course, that the present detector will have a corresponding increase in the number of light guides for the same X-Y dimensions of corresponding conventional scintillator block or the dimensions of the block will be correspondingly reduced.

Thus, as will be apparent from the above, the parameters which must be controlled, according to the present invention, in the manufacture of the light guides to provide the Z-position determinations are:

(1) the cross-sectional dimensions, and hence cross-sectional area, of the light guides;

(2) the reflectivity of the coating (or surface) which reflects scintillation light photons from the side surfaces of the light guides; and (3) the reflectivity of the coating (or surface) which reflects light from the gamma ray receiving end 4 which is, of course, opposite the photodetectors used to determine the Z position. The cross-sectional area of the light guides is, of course, equal to the product of the cross-sectional dimensions of the light guides parallel to the transmitting end 5. As explained above, the cross-sectional area determines the average number of reflections that photons make as they bounce back and forth between the walls 6 of the light guides on their way to the photodetectors. By choosing the reflectivity of the coating, the fraction of photons which are reflected, i.e. not lost, with each reflection is controlled. The product of these two quantities, i.e. the number of reflections times the reflectivity, controls the total fraction of photons which survive in their travel in the light guide from the point of gamma detection and light emission to the photodetectors. Accordingly, by measuring the approximate number of surviving photons at the photodetectors, an analysis can be made in regard to the quantity of the photons for purposes of determining the approximate distance from the photodetectors of each gamma ray emission at the moment it was detected in a light guide.

As noted above, by graduation of the reflectivity of the reflective coating along the length of the walls of the light guide, the loss of light through the guides may be controlled as the light reflects from the walls of the light guides, i.e. control the fraction of photons actually received by the photodetectors. However, as also noted above, the preferred method of achieving a differential fraction of photons received by the photodetectors is that of simply controlling the cross-sectional area of the light guides, and using a reflective coating of a constant reflectivity. Combinations of reflectivity and cross-sectional area of the light guides may be used. It will, however, be quite apparent that no theoretical relationship between the reflectivity and cross-sectional area is possible so as to achieve a desired differential fraction of the surviving photons. Thus, the reflectivity and/or cross-sectional area to achieve a desired fraction of surviving photons must be determined empirically for each particular light guide material, light guide cross-sectional configuration, light guide height, and coating reflectivity. Such empirical determination, however, can easily be made. For example, when a coating of constant reflectivity is utilized, simply decreasing the cross-sectional area of the light guide until the desired photon fraction and differentiation is achieved is all that is required.

This differentiation of emitted light may then be used to determine the Z position of the emitted light. In addition, any of the conventional techniques may be used to determine the X-Y position. One conventional technique employs an analog-to-digital converter (ADC) to integrate the summed charge signal from all of the photodetectors, which yields a digital word measuring the total light detected for each gamma ray. The total-light word is combined with similarly derived ADC words from selected individual pairs of the photodetectors to reference a digital memory from which the digital X and Y coordinates of the excited light guide are read. These X and Y coordinates are routed to another portion of digital memory which records selected ones of them, along with other useful information about the detected gamma ray (such as perhaps its precise time relationship with another gamma ray detected in another detector). From the digital record of many such detected and recorded gamma rays, an image of the unknown object is later reconstructed by a computer. Alternatively, for example, the separate photodiode array of the Moses reference, cited above, may be used to determine X and Y.

In preferred embodiments of the invention, for each detected gamma ray, the total-light word, obtained as described above or by any other conventional technique, along with the digital X and Y coordinates of the excited light guide, are additionally routed to a subsequent digital processor which carries out the Z-position calculation using the method of the invention, as described below.

Using the primary discovery of this invention, namely that the Z position in a particular light guide is uniquely related to the total amount of light detected by the photodetectors when that light guide is excited by a gamma ray, the following method is used to convert the measured light to a Z-position coordinate. For each detected gamma ray, the X, Y and total-light digital words are obtained in any conventional way, such as that described above. These three pieces of digital information are routed to reference a digital memory, e.g. of a computer, which contains a three-dimensional look-up table of depth positions corresponding to every possible value of X, Y and total-light which can be produced by gamma rays detected anywhere in the entire array of light guides. For each gamma ray's particular value of X, Y and total-light, the corresponding depth position is read from the look-up table stored in memory. The depth value so obtained is appended to the list of digital words describing each detected gamma ray, supplying a third spatial coordinate, the Z position. The resulting X-, Y- and Z-position words are subsequently routed to a digital memory, which stores the three-dimensional gamma ray position, along with any other conventional digital information, in the manner described above.

Although the method for obtaining the digital information and storing it in the three-dimensional look-up table of depth position is not a critical part of this invention, a useful method for obtaining that said information and forming the table is set forth in the below example.

However, to fully understand the method of the invention, it is necessary to understand the more usual conventional methods of processing the signals which are produced by the photodetectors in response to the emission of light in the light guides which is in turn caused by the detection of a gamma ray. In a very common conventional method of signal processing, as well described in the aforementioned Dahlbom and Hoffman article, there are several important features, but only the more important features of that article are repeated herein. With reference to FIG. 1, the photodetectors 11 produce signals of electrical current, which are carried on wires 13 from the photodetectors 11 to a conventional pulse processing detector means 12, where the signals are analyzed. In the typical apparatus shown in FIG. 1, there are four such photodetectors, so there are four such signals processed simultaneously by separate sections of the pulse processing detector means 12, each section dedicated to one of the four photodetectors. The sizes of the four signals are equivalent to four numbers, the sum of which measures the total amount of detected light. For example, if the numbers are assigned the values of A, B, C and D, then the total detected light is measured by $A+B+C+D$. The four numbers are further processed either as digital numbers in a digital computer or alternately as a voltage levels in an analog computer, or alternately by some combination of digital and analog means. The four pulse-heights are combined in various simple arithmetic combinations to produce the measured values of X and Y. For example, $X=[(A+C)-(B+D)]/(A+B+C+D)$ and $Y=[(A+B)-(C+D)]/(A+B+C+D)$ are the expressions used by Dahlbom and Hoffman to measure the X position and Y position of the light guide transmitting light from a detected gamma ray. The measures of X and Y, derived typically as just described, are further analyzed for validity, and if qualified as valid are stored in memory to record the detection of the gamma ray. The same process is repeated for each gamma ray detected one after the other, at a rate which may be as high as millions of gamma rays detected each second. After many gamma rays have been so detected and stored in memory, the image of the unknown object is reconstructed by a computer from the stored gamma ray records.

All this description of the function of the conventional detector means 12 of analyzing the signals from the photodetectors 11 is necessary to show that the quantity-of-light, $A+B+C+D$, is typically produced in the conventional detector means 12. The method of the invention transfers this measured quantity-of-light to a further stage of analysis by measuring means 20, where the quantity-of-light is converted to the Z position of the detected gamma ray. The method of converting the quantity-of-light into the Z position of the gamma ray is, in part, the method of the invention.

As noted above, the first primary discovery of the invention is that different gamma rays emitting light at different Z positions in different light guides each produce a different quantity-of-light being detected by the photodetector array. It has additionally been discovered that, due to the difficulty of controlling accurately the uniformity of the surface coatings of the light guide 10, and with equal importance, because of normal manufacturing tolerance differences between the four or more photodetectors 11, the detected quantity-of-light varies systematically from light guide to light guide through the array of light guides, even for identical gamma rays emitting light at exactly the same Z position, but in different light guides. For this reason, it is necessary to have available in the measuring means 20, tabulated information relating the measured quantity-of-light for a particular detected gamma ray and also relating it to the measured quantity-of-light for that particular gamma ray. This table represents a function of three variables, namely X, Y and quantity-of-light. The value of the function is the Z position of the gamma ray which emitted the measured quantity-of light at the measured X and Y position. Such a stored table can take many forms, but one convenient form is as a three-dimensional array of Z positions stored in a digital memory, the memory being indexed by the digitized value of X, Y and quantity-of-light. The stored table is referenced for each detected gamma ray, as the main operation of the method of analysis of the invention for each detected gamma ray in measuring means 20. In the case of a table stored in digital memory, obtaining the value of Z position is done by combining the X position, Y position and quantity-of-light into a digital address pointer which is then used to read a value from the memory location identified by the pointer. The value of the three-dimensional Z-position function obtained from the table, when combined with the X and Y position obtained in the conventional way, forms a complete three-dimensional position measurement of the gamma ray in the light guide.

The method for forming the three-dimensional table of Z position as the function of X position, Y position and quantity-of-light is, therefore, similar to the methods used in determining X-Y positions, which methods are well known to the art. The present method, however, as explained above, departs therefrom in that all of the X, Y and quantity of light are combined to provide a pointer to specific X, Y and Z positions of light emission, as stored in a look-up table. Other similar methods could be equally used. However, a most useful method is described in the example below.

With these three positions of a gamma ray emission recorded in a memory, e.g. of a computer, in a conventional manner, and when the encoding process is repeated for as many gamma rays as are needed to characterize the object being investigated, a much clearer image, without the poor quality and blurring, especially at the edges of the object, is provided.

Figure 2A:
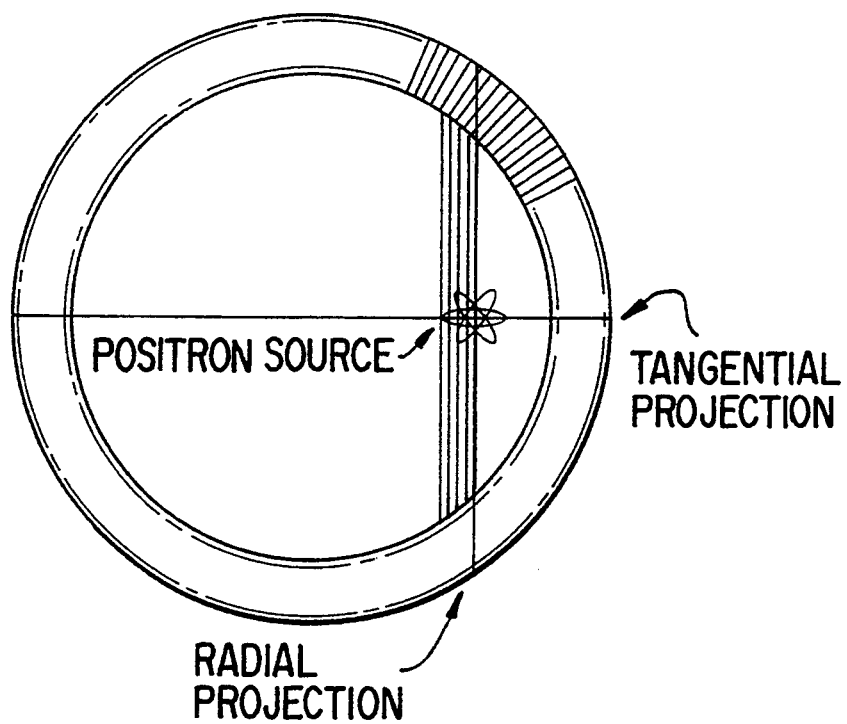
FIGS. 2A, 2B and 2C are an idealized representation showing how the present invention obviates the blurring difficulties of conventional detectors in PET cameras.

In this latter regard, a better understanding of this improvement can be seen from FIG. 2A, which illustrates the blurring effect in detectors which only measure the gamma ray emission position in two dimensions. The drawing shows a cross-section of a typical PET camera, which has many detectors placed side-by-side in a circular form. The "Tangential Projection" of a small point source is, of course, precise, i.e. narrow, whereas the "Radial Projection" is blurred due to the unmeasured third dimension which is referred to in the art as "depth of interaction". Of course, if the point source was located at the center of the detectors, as opposed to the off-center illustrated location, both projections would be precise, i.e. narrow, similar to that indicated for the "Tangential Projection". Unfortunately, however, of course, all source positions are not located at the center of the detectors, and, therefore, as the source moves toward the edges of the camera, the blurred image inevitably takes place with conventional detectors, but is largely avoided with the present detectors.

EXAMPLE

A square block of bismuth germanate, having side dimensions 5 cm and depth 3 cm, was sawed by perpendicular cuts which were empirically and conventionally tuned in depth to produce a conventional sharing of light among the four photomultiplier tubes attached to the transmitting end of the block. The spacing of the saw cuts provided light guides with approximately 16% of the cross-sectional area of conventional light guides. Using this extreme change in the cross-sectional area made it unnecessary to additionally tune the reflectivity of the coating mixture, so that the conventional epoxy/aluminum-oxide mixture was used to coat all the exposed surfaces of the light guides, in the conventional manner. Four photomultiplier tubes were attached to the inputs of four charge sensitive ADC's (Lecroy 4300B), which were read into the memory of a Sun 4/370 computer. For each detected gamma ray, the computer wrote a record on a hard disk which encoded the gamma ray's position in the block including X position, Y position (which were measured in the conventional way) and the sum of all four ADC values, which is a measure of the quantity-of-light. Several million such gamma ray detection records were written on the disk from two different gamma ray emitting phantom objects, described below. An image of the phantom objects before and after correcting them with the method of this invention were compared to evaluate the improvement which comes from the application of the invention.

The required three-dimensional table was stored in the memory of the Sun 4/370 computer and used to correct the blurring of the images of the phantom object, according to the method of the invention described above. The three-dimensional table had been previously determined by a separate series of measurements made on the same block detector. The measurements used to determine the table were as follows: A collimated beam of gamma rays was arranged to illuminate the block with the beam travelling parallel to the plane defined by the receiving ends (54 in FIG. 1) of the light guides. With the beam defined in such a way, all the gamma rays which emit light do so at the same distance from the receiving end of one or another of the light guides and, therefore, every gamma ray emits light at some X and Y position or another among the light guides, but each such gamma ray has a single well-defined value of Z position. In this case, each light guide produces a characteristic quantity-of-light equal to a particular value for that light guide, varying a little more or less by only the well known gamma ray energy resolving power of bismuth germanate, i.e. a range of variation of about 20% for the most probable quantity-of-light. By repeating the measurement with the beam positioned at many different Z positions 53–56, the complete relationship was mapped out between Z position and quantity-of-light for each of the light guides. The tabulated values of the observed quantity-of-light for every value of X and Y comprise a tabulated function of three variables, X, Y and Z position. This function was mathematically inverted to exchange the Z-position variable with the quantity-of-light function value, using linear interpolation between the measured values of Z position to obtain a Z position for every possible value of quantity-of-light which could theoretically be produced by the ADC's. The resulting table is the desired Z position as a function of X, Y and quantity-of-light.

Figure 2B:
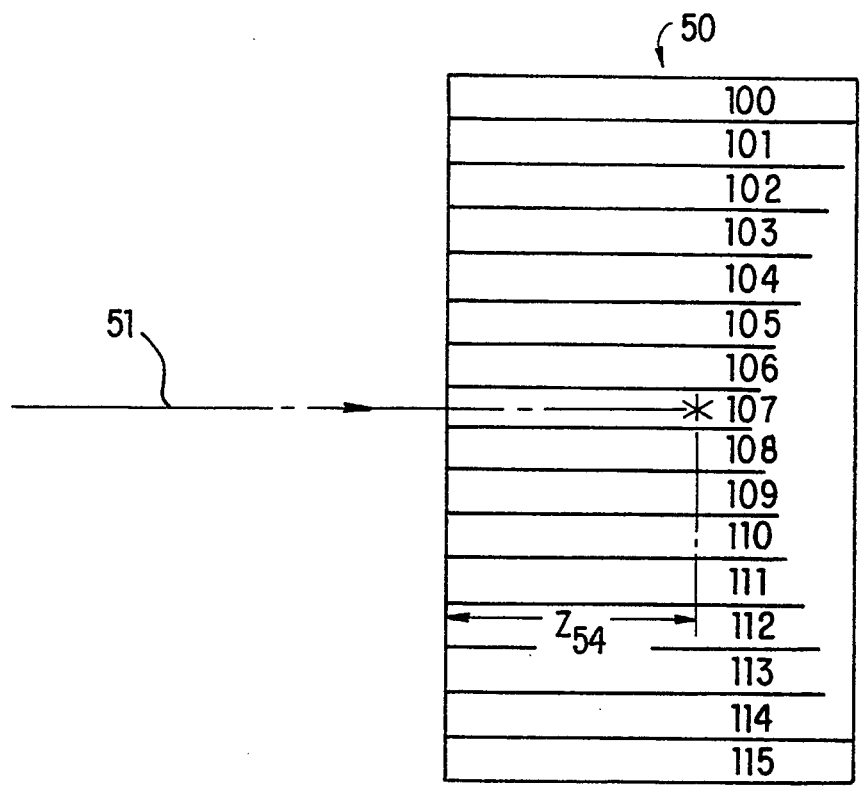
Figure 2C:
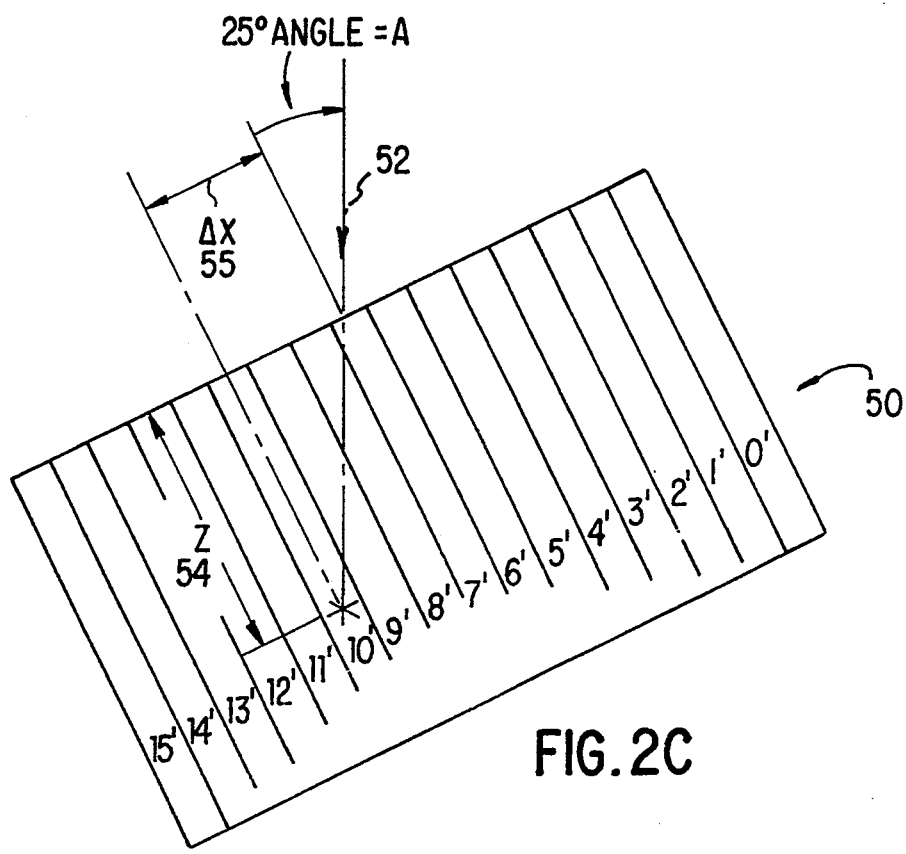

Two gamma ray phantoms were arranged as in FIGS. 2B and 2C, which show one row of light guides 50, numbered 100–115 in FIG. 2B and 0'–15' in FIG. 2C, and two different gamma ray beams, 51 in FIG. 2B and 52 in FIG. 2C. The beam 51 strikes the detector at right angles, which will produce the "Tangential Projection" shown diagrammatically in FIG. 2A, whereas the inclined beam 52 strikes the detector at a 25° angle, which will produce the "Radial Projection" of FIG. 2A.

Figure 3A:
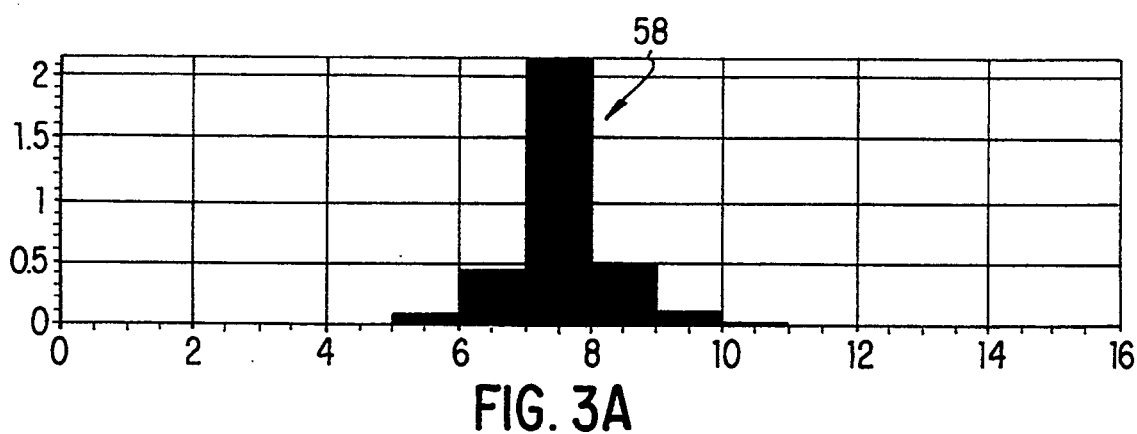
FIGS. 3A, 3B and 3C show examples of projection images demonstrating blurring in a conventional detector and reduction of blurring using the apparatus and method of the invention.
Figure 3B:
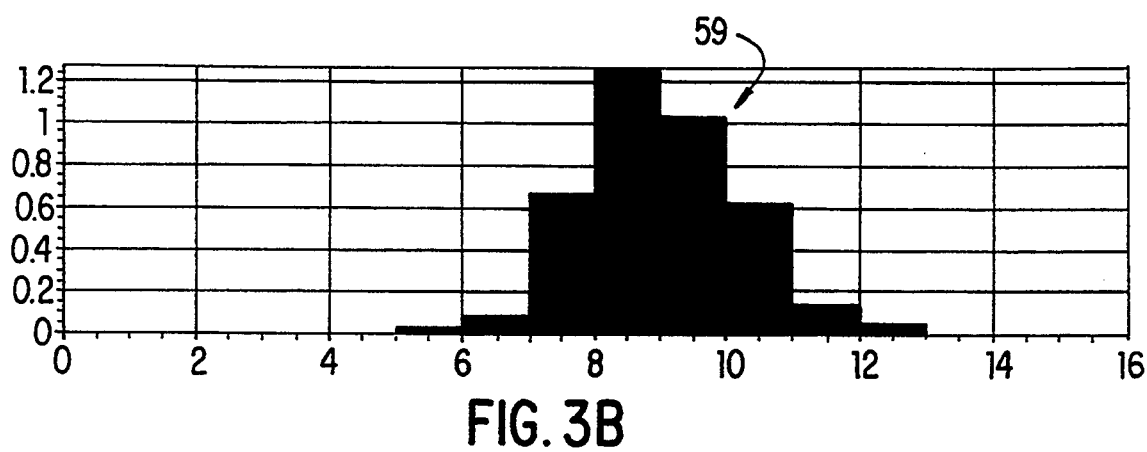

FIG. 3A shows the actual measured tangential projection 58 from the phantom geometry of FIG. 2B, whereas FIG. 3B shows the measured radial projection 59 from the phantom geometry of FIG. 2C, before the correction method of the invention was applied. The projection 59 in FIG. 3B is much wider than the projection 58 in FIG. 3A. Because the measured radial projection 59 no longer represents the narrow gamma ray beam (e.g. it is much wider than the gamma beam width, which it is supposed to measure), if such a projection were used to reconstruct an image of the point source, the image would be blurred by the width of the projection 59, as is well known to those skilled in the art of image reconstruction from projections. Although this detector has the capability for correcting the radial projection for this blurring, using the method of the invention, the projection 59 of FIG. 3B is shown uncorrected because the correction method was intentionally not yet activated in forming the projection 59. FIG. 3B is, therefore, the "before correction" radial projection, which is the best radial projection that this detector or any conventional detector would be capable of in imaging this phantom without the improvement of the invention. A purpose of the invention is to correct the projection 59 to look more like the ideal radial projection 58, as shown in FIG. 3A. Such a correction is the next step demonstrated in this example.

To understand how the measured Z position is used to correct for the blurring of the radial projection, it is necessary to understand some of the details of the mechanism which cause the blurring, as shown diagrammatically in FIGS. 2B and 2C. In the case of the normally incident gamma ray 51, the gamma ray travels entirely in one or at most two light guides, so that it always produces an X position which is very nearly equal to the number of the light guide, e.g. 107 in FIG. 2B. On the contrary, the angled incident gamma ray 52 travels across several different light guides and may, by chance, emit light in any one of the light guides it crosses. The gamma ray 52 shown in FIG. 2C emits light in light guide number 10', but for other gamma rays travelling along the same beam line 52, the gamma rays might by chance emit light and be measured to be in the position of any of the light guides the gamma rays cross, namely 7', 8', 9', 10' or 11'. The blurred projection 59 shows the distribution of gamma rays among the light guides which results from measuring the X position of many such gamma rays entering the crystal along the same beam line. Only if the Z position of each gamma ray is also recorded can a correction be made to calculate the X position of the light guide 7' where the gamma ray first entered the detector. This corrected X position in the light guide 7' is the same as the X position of the normally incident gamma ray 51, so that the correction will undo the error in the radial projection 59 measured with the inclined beam 52.

Thus, the corrected projection will look more like the ideal tangential projection 58 measured with the normal beam 51. The numerical relationship used in the computer in making the needed correction $\Delta X$ 55 is the measured Z position 54 multiplied by the sine of the angle that the gamma beam makes with the detector, i.e. $\Delta X = Z * \sin(A)$. For the purposes of this example, the computer calculated this correction $\Delta X$ 55 and added it to the measured X position for each gamma ray, one at a time.

Figure 3C:
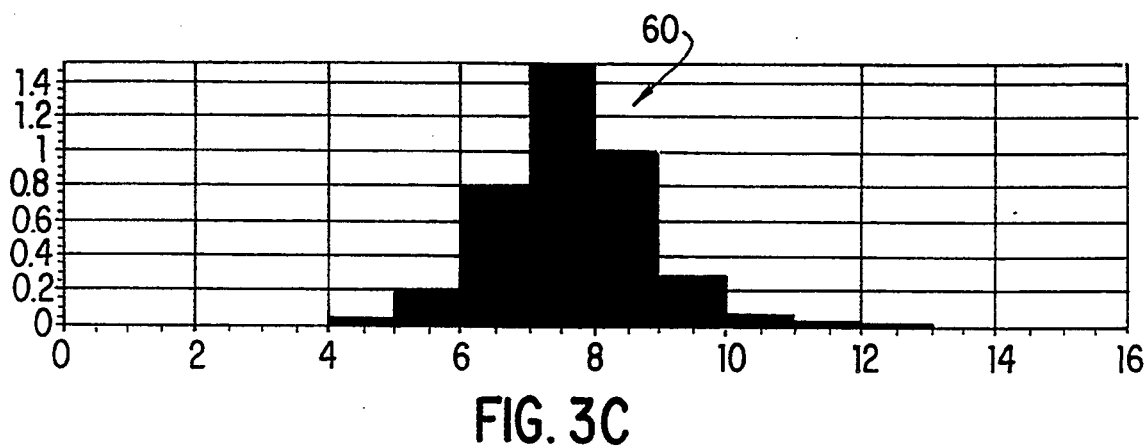

By processing the disk records of the same gamma rays 52, previously shown in FIG. 3B but now using the method of the invention, the corrected projection 60, shown in FIG. 3C, was obtained. It can be seen that the corrected projection 60 is more narrow than the uncorrected projection 59, by an amount which is measured to be about 25%. Thus, the example demonstrates that the invention improves the blurring of images in the case of bismuth germanate used for PET by about 25%, which is a substantial improvement. The percentage amount of improvement will be greater when applying the method of the invention in the apparatus of the invention incorporating not bismuth germanate, but a crystal with better gamma ray energy resolving power, such as cerium doped lutetium oxyorthosilicate. Bismuth germanate was chosen to demonstrate the principle of the invention because it is readily available and less expensive and is, accordingly, an industry preferred material.

It will be appreciated that while certain embodiments of the invention have been described above, other embodiments will be equally obvious to those skilled in the art. It is, therefore, intended that those embodiments be embraced by the spirit and scope of the annexed claims.

What is claimed is:

1. An apparatus for determining the X, Y and Z positions of a point of gamma ray induced light emission in a pattern of a plurality of scintillating light guides, comprising:

(1) a plurality of spatially separated, closely adjacent, elongated, scintillating, crystal, light guides arrayed in a pattern having known X and Y positions for each light guide, each of said light guides having a gamma ray receiving end, a light transmitting end, and walls therebetween;

(2) a light reflective surface on at least a portion of the walls of each of the light guides having light reflectivity such that the fraction of gamma ray induced light passing through the transmitting end is substantially greater for gamma ray induced light emissions closer to the transmitting end and substantially less for emissions closer to the receiving end;

(3) at least one photodetector disposed in register with the transmitting ends such that the said fraction of gamma ray induced light transmitted through the transmitting ends is intercepted by the at least one photodetector;

(4) detector means responsive to gamma ray induced light emitted in the said light guides for determining an excited light guide from which gamma ray induced light was emitted to thereby establish the X and Y positions of the gamma ray induced light within the pattern of light guides; and (5) measuring means responsive to light intercepted by the at least one photodetector for determining the amount of emitted light received by the at least one photodetector and from that determined amount of emitted light determining the distance from the transmitting end to the point of gamma ray induced light emission in the excited light guide, to thereby establish the Z position of the gamma ray induced light within the pattern of light guides.

2. The apparatus of claim 1 wherein the light guides have a uniform and generally rectangular cross-section.

3. The apparatus of claim 1 wherein the gamma ray receiving end is substantially planar.

4. The apparatus of claim 1 wherein the light guides are formed in an elongated crystal with the light guides extending less than a length of the crystal so as to provide a continuous light transmitting portion of the crystal on at least one end of the light guides.

5. The apparatus of claim 4 wherein the continuous light transmitting portion is adjacent to and optically connected to the light transmitting ends of the light guides.

6. The apparatus of claim 1 wherein the crystal of the light guides is bismuth germanate.

7. The apparatus of claim 1 wherein the light guides are generally uniform and rectangular in cross-section and are formed in a generally rectangular block of crystal with slits in the block extending from the receiving ends to the light transmitting ends so as to separate the light guides formed in the block.

8. The apparatus of claim 1 wherein the walls and the gamma ray receiving end of each light guide have the reflective surface.

9. The apparatus of claim 1 wherein the reflective surface has a substantially uniform reflectivity along the walls of each light guide and a cross-section of said light guides is dimensioned such that the fraction of light passing through the transmitting end is substantially greater for gamma ray induced light emissions closer to the transmitting end and substantially less for emissions closer to the receiving end.

10. The apparatus of claim 1 wherein a difference in the fraction of light between transmitting and receiving ends is at least 1.3 times greater than the gamma ray energy resolving power of the crystal of the light guides.

11. The apparatus of claim 10 wherein the said difference in the said fraction of light is at least 2.0 times greater.

12. The apparatus of claim 1 wherein the photodetectors are photomultiplier tubes or photodiodes.

13. The apparatus of claim 1 wherein the light reflecting surface is a coating.

14. A method for determining the X, Y and Z positions of a point of gamma ray induced light emission in a pattern of a plurality of scintillating light guides, comprising:

(1) providing a plurality of spatially separated, closely adjacent, elongated, scintillating, crystal, light guides arrayed in a pattern having known X and Y positions for each light guide, each of said light guides having a gamma ray receiving end, a light transmitting end, and walls therebetween;

(2) providing a light reflective surface on at least a portion of the walls of each of the light guides, which surface has light reflectivity such that the fraction of gamma ray induced light passing through a transmitting end is substantially greater for gamma ray induced light emissions closer to the transmitting end and substantially less for light emissions closer to the receiving end;

(3) irradiating the light guides with gamma rays;

(4) intercepting gamma ray induced light transmitted through the transmitting ends by at least one photodetector disposed in registry with the transmitting ends;

(5) determining from the light emitted from a light guide which light guide was excited by a gamma ray, to thereby establish the X and Y positions of the gamma ray induced light within the pattern of light guides;

(6) determining from the light intercepted by the at least one photodetector the amount of emitted light received by the at least one photodetector; and (7) determining from that amount of emitted light received, the distance from the transmitting end to the point of gamma ray induced light emission in an excited light guide, to thereby establish the Z position of the gamma ray induced light within the pattern of light guides.

15. The method of claim 14 wherein the light guides have a uniform and generally rectangular cross-section.

16. The method of claim 14 wherein the light guides are formed in an elongated crystal with the light guides extending less than a length of the crystal so as to provide a continuous light transmitting portion of the crystal on at least one end of the light guides.

17. The method of claim 16 wherein the continuous light transmitting portion is adjacent to an optically connected to the light transmitting ends of the light guides.

18. The method of claim 14 wherein the crystal of the light guides is bismuth germanate.

19. The method of claim 14 wherein the walls of each light guide have a reflective coating thereon.

20. The method of claim 14 wherein the reflective surface has a substantially uniform reflectivity along the walls of each light guide, the light guides have a uniform cross-section, and the cross-section of the light guides is dimensioned such that the fraction of light passing through the transmitting end is substantially greater for gamma ray induced light emissions closer to the transmitting end and substantially less for emissions closer to the receiving end.

21. The method of claim 14 wherein a difference in the fraction of light between transmitting and receiving ends is at least 1.3 times greater than the gamma ray energy resolving power of the crystal of the light guides.

22. The method of claim 14 wherein the photodetectors are photomultiplier tubes or photodiodes.

23. The method of claim 14 wherein the X and Y positions and the determined amount of emitted light are encoded into a memory and a memory holds an encoded look-up table of the amount of emitted light related to a distance in a light guide from the transmitting end to the position of the point of light emission for light guides corresponding to the encoded X and Y positions.

24. The method of claim 23 wherein a comparison of the amount of emitted light with amounts of light in the look-up table for a determined X and Y position establishes the Z position of the emitted light.

25. The method of claim 23 wherein the memory is digital memory.

26. The method of claim 25 wherein the memory is the memory of a computer.

* * * * *